H. H. NORRINGTON.

Perforating-Stamp.

No. 8,657. Reissued April 8, 1879.

WITNESSES:

W. W. Hollingsworth

Amos W. Hart

INVENTOR:

H. H. Norrington

BY

ATTORNEYS

UNITED STATES PATENT OFFICE.

HENRY H. NORRINGTON, OF WEST BAY CITY, MICHIGAN.

IMPROVEMENT IN PERFORATING-STAMPS.

Specification forming part of Letters Patent No. 209,915, dated November 12, 1878; Reissue No. 8,657, dated April 8, 1879; application filed February 12, 1879.

*To all whom it may concern:*

Be it known that I, HENRY H. NORRINGTON, of West Bay City, in the county of Bay and State of Michigan, have invented a new and useful Improvement in Perforating-Stamps; and I do hereby declare that the following is a full, clear, and exact description of the same.

My invention is an improvement in the class of hand-perforating-stamps or check and draft punches in which the figures representing the amount for which the check or draft is drawn are cut bodily from the paper, for the purpose of preventing fraudulent alteration by obviating the possibility of changing the face of the check or draft to some different amount.

The improvement relates to the construction and arrangement of parts, as hereinafter described and claimed.

Figure 1:
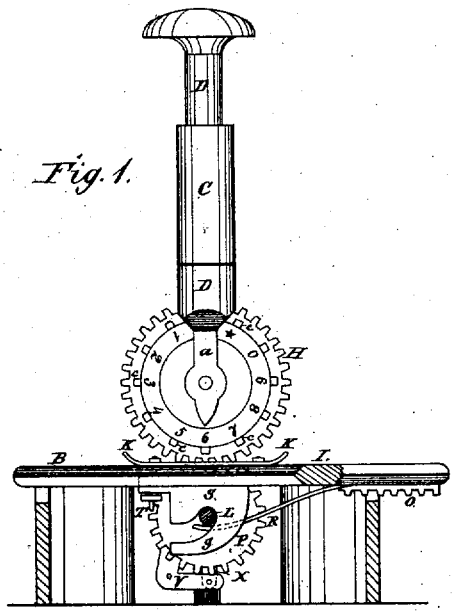
Figure 2:
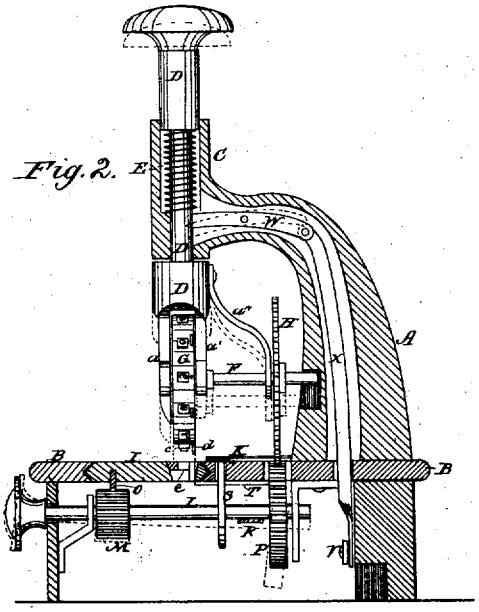
Figure 3:
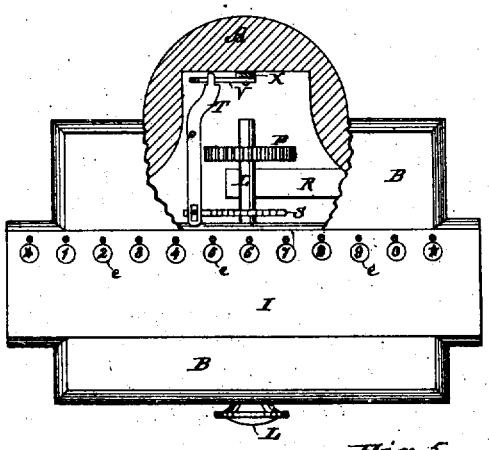
Figure 4:
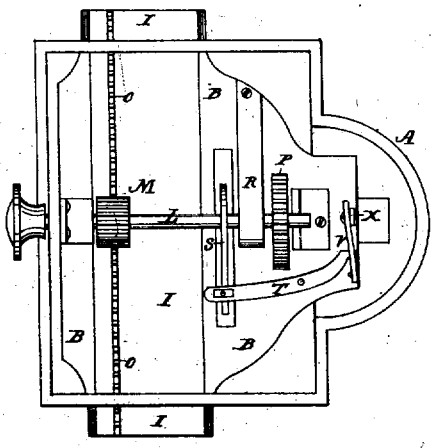
Figure 5:
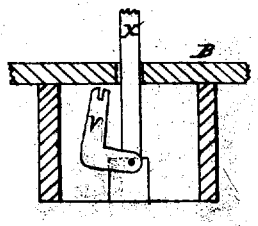

In the accompanying drawings, forming part of this specification, Figure 1 is an elevation of my improved stamp, with part in section. Fig. 2 is a vertical section of the same. Fig. 3 is a horizontal section. Fig. 4 is an inverted plan view. Fig. 5 is a detail view.

The hollow standard A of the punch rises from a recessed bed-plate or base, B, and is provided with a vertical head, C, in which the plunger D is fitted so as to reciprocate in the desired manner.

The plunger D is supported by a spiral spring, E, which encircles its middle portion within the head C, and its lower part is formed of three arms, *a a′ a″*, in which the horizontal axis F of the punch-carrying wheel G and feed-gear H has its bearings. Said wheel G is set vertically between the arms *a a′* of the plunger D, and is fast on its shaft F, so as to rotate with it.

A series of punches, *c*, (twelve in number,) project radially from the periphery of the wheel at regular intervals of space. Two of the continuous punches *c* have their faces—*i. e.*, their outer ends—cut to represent stars, or any other device or figure which is not a numeral, for a purpose hereinafter explained. The remaining ten punches *c* represent the nine digits and the cipher (0.) Contiguous to and behind each punch *c* is a radially-projecting pin or stud, *d*.

The punches *c* and also the studs *d* may be formed solid with the wheel, or fitted in sockets, so as to be detachable.

In the bed B is a plate, I, which is arranged to slide in either direction parallel to the plane of the punching-wheel G. A series of female dies, *e*, is set in a lengthwise row in this slide, the same corresponding to the male dies *c* of the wheel G, both as to form or contour and as to distance apart. A series of holes is also formed in the slide, directly in rear of but parallel to the dies *e*, to receive the pins *d*.

It is obvious that when the requisite pressure is applied to the plunger D the spring E will be compressed, and the punching-wheel G carried down onto the bed-slide I; and if the latter be adjusted properly the punch *c* and guide-pin *d*, which are at the bottom of the wheel, will enter the corresponding die *e* and hole in said slide. Hence, in order to punch from the body of a check or draft the numerals making up the amount for which it is drawn it is only necessary to insert the upper edge of the paper under the spring clip or presser K, and, the wheel being properly adjusted, the plunger is successively depressed or forced down, thus carrying the selected punches—*i. e.*, the punches representing the numerals of the money amount—down through the paper. In this operation the pins *d* act both as guides and safety-stops, since, being larger than the punches, they must first enter the holes in the slide I before the punches *c* can come forcibly in contact with the paper; hence, if there is not the proper registration between a punch *c* and its die *e* the pin *d* contiguous to such punch will, as the plunger descends, strike on the slide I and arrest the downward movement before the punch can imprint the paper.

I will now proceed to describe the mechanism for feeding and adjusting the slide I.

The movement of the slide is always simultaneous with the rotation of the punching-wheel in one direction or the other, so that when any punch *c* is at the bottom of the wheel the corresponding die *e* will always be directly beneath it. This registration is secured by the shaft L, which carries a pinion, M, that meshes with the rack O on the under side of the slide I, and a gear, P, that meshes with the large gear H on shaft F. Thus the rotation of the feed-shaft L will move the slide I and rotate the punching-wheel G.

The arm $a''$ of the plunger D may be extended down through a slot in the bed-plate B, and form the support or bearing of the inner end of the shaft L, so that the gears H and P will be held in mesh while the plunger is in its normal or elevated position as well as when depressed; but I prefer to employ a spring, R, which presses upward against the inner end of the shaft L, as best shown in Figs. 1 and 4.

When the plunger is forced down the gear H necessarily partakes of its motion, and the feed-shaft L will hence be thrown into the inclined position shown in dotted lines, Fig. 2.

Each reciprocation of the plunger feeds the paper (check or draft) along the same distance as the space between two of the dies. This is effected by the following-named devices: A ratchet or feed-plate, S, projects up through a slot in the bed-plate B, and has a vertical downward extension, $g$, in which is formed a curved slot to receive the feed-shaft L, so that the latter will not only support the feed-plate, but allow it to have a reciprocating movement. Such movement is imparted by suitable connection with the plunger D through a lever, T, which is pivoted to the bed-plate and connected with an elbow-lever, V, a lever, W, pivoted in the head C, and a link, X, which extends down through the standard A, and connects the levers V and W. The front end of lever W is depressed simultaneously with the plunger D, and hence raises link X and vibrates lever T, thus pushing the feed-plate S forward; and when the plunger rises the same system of levers draws the feed-plate S back to its former or normal position, and thus feeds or moves the paper along. The feed is therefore automatic; but the punching-wheel is adjusted by hand through the medium of shaft L, and gears H, and shaft F.

In using the machine the punching-wheel will be first so adjusted as to punch a star, or other figure or design which is not a numeral, in the check or draft, and after the numerals representing the amount for which the paper is drawn have been duly punched another star is punched at the end of the amount, thereby affording a perfect check against the addition of other figures, either before or after the amount.

For convenience in adjusting the punching-wheel, the numerals corresponding to those on punches $e$ are inscribed on the face of the wheel, near the periphery.

I am aware that a series of punches have been placed vertically side by side in a horizontally-movable frame, and that a plunger has been arranged in such relation thereto as to adapt it to act on the punches one at a time, and in any desired order or succession; also, that a punching-wheel and a die-wheel have been combined with other mechanism, so that when a hinged lever to which the punching-wheel is attached is depressed the two wheels will be brought together, and the due registration of their punches and dies preserved in any adjustment. Such mechanism or combination of parts forms no part of my invention.

What I claim is—

1. In a perforating-stamp, a rotatable wheel provided with radial punches and a plunger or rod attached thereto, and arranged to reciprocate with it in a true vertical plane, the meshing-gears mounted, respectively, on the same shaft with the punching-wheel and on the counter or feed shaft, and the die-carrying slide connected with feed-shaft by a pinion, all combined and operating as specified.

2. In a perforating-stamp, the combination, substantially as described, of a vertically-acting plunger and a punching-wheel and gear, a feed-shaft attached to the bed-plate and a pinion and gear, the die-carrying slide, also a device for supporting said feed-shaft, substantially as described, so that when the plunger and punching-wheel are forced down the gears will remain in mesh, as specified.

3. In a perforating-stamp, the combination, substantially as described, of a vertically-acting plunger and a punching-wheel and gear fixed on the same shaft, having its bearings in the arms of said plunger, a feed-shaft attached to the bed-plate and a pinion and gear, the die-carrying slide, also a device for supporting said feed-shaft, substantially as described, so that when the plunger and punching-wheel are forced down the gears will remain in mesh, as specified.

4. In a perforating-stamp, the combination of the feed-plate, having the curved slot in its wing or downward extension, the shaft L, and the levers, connecting rod or link, and the plunger, for reciprocating the feed-plate, as shown and described.

5. In a perforating-stamp, the feed-plate, working through a slot in the bed-plate, and having a slotted wing or downward extension, the described devices for connecting the feed-plate and plunger, and a spring-clip for holding the paper on the bed-plate, all said parts being combined substantially as shown and described.

6. In a perforating-stamp, the combination of the spring-supported plunger, the levers T V W, link X, hollow standard A, the shaft L, and the feed-plate S, having the downward extension $g$, with a curved slot, and the spring R, all as shown and described, whereby the reciprocation of the plunger moves the shaft L downward in the slot, and simultaneously reciprocates the feed-plate horizontally, as specified.

HENRY H. NORRINGTON.

Witnesses:
H. H. APLIN,
IRA J. COVEY.